Figure 1:
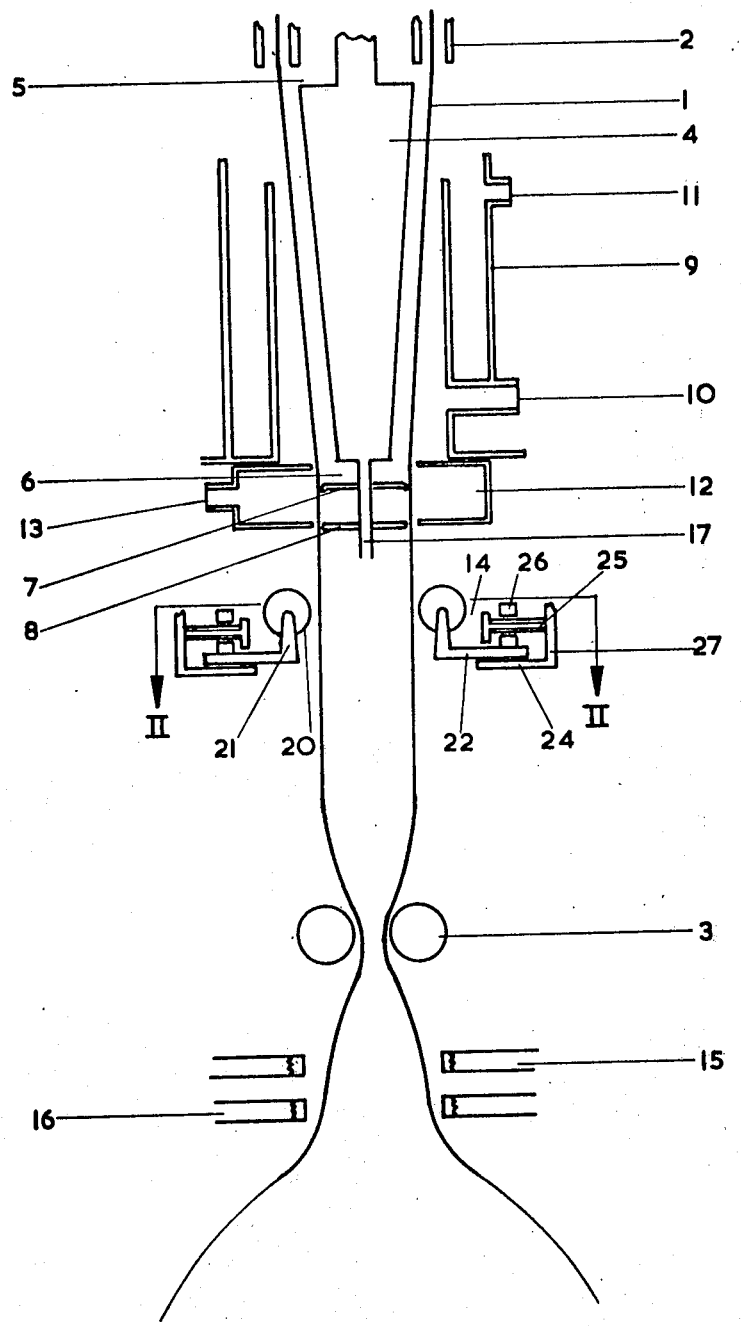

United States Patent [19]
Davis et al.

[11] 3,993,723
[45] Nov. 23, 1976

[54] COOLING THERMOPLASTIC TUBES

[75] Inventors: John Brian Davis; Derek Skilling; Nigel Edwin Wrigley, all of Dumfries, Scotland

[73] Assignee: Imperial Chemical Industries Limited, London, England

[22] Filed: June 17, 1974

[21] Appl. No.: 480,273

[30] Foreign Application Priority Data
July 2, 1973 United Kingdom............... 31404/73

[52] U.S. Cl.............................. 264/95; 264/178 R; 264/210 R; 264/237; 425/326 R
[51] Int. Cl.²......................................... B29D 23/04
[58] Field of Search............ 264/89, 95, 178 R, 237; 264/210 R; 425/71, 72, 326 R, 384

[56] References Cited
UNITED STATES PATENTS

| | | | |
|---|---|---|---|
| 2,926,384 | 1/1960 | Hertz et al............................ | 425/72 |
| 3,596,321 | 8/1971 | Upmeier............................. | 425/326 |
| 3,725,519 | 4/1973 | Seifried et al.................. | 264/210 R |
| 3,814,785 | 6/1974 | Reade................................... | 264/95 |
| 3,819,776 | 6/1974 | Robinson et al.................... | 264/237 |

FOREIGN PATENTS OR APPLICATIONS 250,616    2/1963    Australia............................. 264/95

*Primary Examiner*—Jeffery R. Thurlow
*Attorney, Agent, or Firm*—Cushman, Darby & Cushman

[57] ABSTRACT

Cooling an extruding thermoplastic tube by feeding the tube adjacent a cooling surface, maintaining a sheath of heat-transfer fluid between the tube and surface and preferentially cooling at least a selected area of the tube by transversely displacing the tube to decrease the thickness of the sheath between the selected area and the cooling surface. The invention is particularly suitable, for the production of thermoplastic films by orienting a cast tubular extrudate which has been cooled by means of an internal mandrel.

6 Claims, 3 Drawing Figures

COOLING THERMOPLASTIC TUBES

This invention relates to the production of tubular films, and, in particular, to a method and apparatus for cooling an extruding tube of thermoplastic material.

Oriented tubular film is usually produced by extruding a relatively thick-walled thermoplastic tube from an annular orifice, and subsequently stretching the extruded tube, at a temperature above the glass transition temperature (Tg) and below the melting temperature of the thermoplastic material, in the transverse and/or longitudinal directions to form a thin film, the streching being effected in the transverse direction by means of internal gas pressure and in the longitudinal direction by withdrawing the tube at an accelerated rate in the direction of extrusion. In the case of oriented films produced from crystallisable polyesters, the polyester should be in a substantially amorphous state when stretched, and the extrudate must therefore be rapidly cooled, prior to reheating and stretching, to retain the polymer in the amorphous state. Likewise, in the formation of oriented films from crystalline polymers, such as polyolefines, it is necessary to cool the extrudate to produce sufficient nuclei to ensure that individual spherulites remain small, thereby enabling the extruded tube to be readily stretched, when reheated, to yield a transparent film.

Cooling of the extruding tube is conveniently effected internally and/or externally. For example, the tube may be internally cooled by means of a cooling mandrel located within the tube in the vicinity of the die from which the tube is extruded, while external cooling may be effected by passing the tube through a closely-fitting cooled sleeve. Efficient transfer of heat from the tube to a mandrel-or sleeve-cooling surface may be ensured by flowing a lubricating heat-transfer fluid between the tube and that surface. By simultaneously cooling the exterior and interior surfaces of the extruding tube, increased rates of film production may be achieved.

At high extrusion rates, difficulty has been experienced in producing, by the aforementioned methods, oriented tubular film of consistently high quality and uniformity of thickness around the tube circumference. We now believe that this variation in film quality arises from an inability to maintain a uniformly thick layer of heat-transfer fluid between the tube and the external and/or internal cooling surface, the resultant irregular cooling of the tube manifesting itself in the form of variations and irregularities in the thickness profile of film subsequently formed by orienting the reheated tube.

We have now devised an improved technique for cooling extruded thermoplastic tubes.

Accordingly, the present invention provides a method of cooling an extruding tube of thermoplastic material comprising feeding the tube, in the direction of extrusion, in heat-transfer relationship with an adjacent cooling surface, maintaining said cooling surface at a temperature below the melting point of the thermoplastic material, maintaining a sheath of a heat-transfer fluid between, and in contact with, the tube and said cooling surface, and preferentially cooling at least a selected area of the extruding tube by displacing the tube transversely of the direction of extrusion to decrease the thickness of the fluid sheath between the selected area and the cooling surface.

The present invention also provides an apparatus for cooling an extruded tube of thermoplastic material comprising an annular orifice for extrusion of the tube, a cooling surface, means for withdrawing the tube, in the direction of extrusion, in heat-transfer relationship with said cooling surface, means for providing a sheath of a heat transfer fluid between, and in contact with, the tube and said cooling surace, and means for displacing the tube transversely of the direction of extrusion to decrease the thickness of the fluid sheath between at least a selected area of the tube and the cooling surface.

According to one embodiment of the invention the cooling surface is in the form of a cooled, internal mandrel, coaxial with the extrusion orifice, and located within the extruding tube. A typical dry mandrel system which is particularly suitable for the production of tubular polyester films, is described in the Complete Specification of British Patent No. 1,271,694which relates to the production of film by melt extruding a tube of a thermoplastic material, withdrawing the tube over a cooled, matt-surfaced sizing mandrel which is of smaller diameter than the diameter of the extrusion orifice at a greater rate than the speed of extrusion of the tube, the mandrel being tapered over the length in which it is in contact with the tube to allow for the contraction of the tube as it cools to the solid state, passing the tube over a seal positioned within the tube at a point where it will not stick to the seal, heating the tube to its stretching temperature, and introducing gas under pressure to within the tube at a position beyond the seal, and finally collapsing the expanded tube.

A typical lubricated mandrel system suitable for the production of polyolefine films, to which the techniques of the present invention may be applied is described in the Complete Specification of British Patent No. 1,284,321 which relates to the cooling of an extruded tube by passing an extruded tube over an internal cooling mandrel, continuously supplying a film of heat-transfer liquid to between the mandrel and the tube, maintaining, at the end of the mandrel remote from the extruder, a head of liquid capable of exerting pressure on the film of liquid, and withdrawing the liquid from the head, wherein the pressure of the liquid between the mandrel and the tube at any one point is greater than the pressure on the outside of the tube at that point. The film of heat-transfer liquid is conveniently supplied by overflow from a circumferential channel at the upstream end of the mandrel, i.e. adjacent the extrusion die.

The disclosures of the aforementioned British Patent No. 1,271,694, and British Patent No. 1,284,321 are incorporated herein by reference.

According to a further embodiment of the invention the cooling surface is in the form of a cooled annular passageway into and through which the extruded tube is passed. A typical system of this kind, the so-called "weir" system, is described in the Complete Specification of British Patent 741,963 which relates to the production of thin walled tubing or tubular film by continuously extruding a molten organic thermoplastic material in tubular form, and continuously withdrawing the tubing downwardly in a substantially vertical direction from the extruder while maintaining within the tubing a volume of gas such that the degree of inflation and the rate of withdrawing the tubing bring about a reduction in thickness of the tubing, wherein the inflated tubing is passed through a passageway which, at least at the entrance end for the tubing, is of substantially circular cross-section, and which is interiorly bathed by a downwardly flowing heat- transfer liquid which contacts the whole of the external surface of the tubing or tubular film as it passes through the passageway. The disclosure of British Patent No. 741,963 is incorporated herein by reference.

If desired, a combination of an internal mandrel and an external liquid cooling bath may be employed.

To ensure that the extruded tube is adequately cooled, the tube, as hereinbefore described, should be spaced apart from the cooling surface by means of a thin sheath of heat-transfer fluid maintained between the tube and cooling surface. Preferably the heat-transfer fluid is a liquid, such as water, but a gas, conveniently air, may be employed, particularly in conjunction with an internal mandrel the cooling surface of which is provided with a porous, or matt-finish, which enables an extremely thin layer of the gas, injected into the space between the mandrel and extrusion orifice, or diffused through the wall of the mandrel, to be trapped between the tube and cooling surface to decrease the coefficient of friction between the tube and surface, thereby facilitating passage of the closely fitting extruded tube over the cooling mandrel.

In addition to its cooling function, the cooling surface also serves to size or dimension the extruding tube, and it is therefore desirable that the sheath of heat-transfer fluid should be as thin as practicable, so that the tube conforms closely to the shape of the cooling surface. In the case of an internal mandrel cooling surface, the thickness of the heat-transfer fluid sheath is conveniently from 200 to 500 microns, while with an external cylindrical weir cooling surface a sheath thickness of from about 200 to 1300 microns is suitably employed.

Although the thickness of the heat-transfer fluid sheath between the extruded tube and cooling surface may be altered simply by the application, either internally or externally of the tube, of a thrust transverse to the direction of extrusion of the tube, we consider that better control of the degree of cooling of the tube is achieved by the provision of a fulcrum for engagement with the tube surface, whereby on application of a transverse thrust to the tube surface, the tube pivots about the fulcrum thereby altering the separation between the tube and the cooling surface. Preferably, the fulcrum is located at or adjacent the end of the cooling surface remote from the extrusion orifice.

Conveniently, the fulcrum is in the form of a continuous, circular lip or rim standing proud of the adjacent cooling surface to engage the tube surface and may be of polished metal or other material which will not abrade or damage the tube surface, but preferably, is in the form of a resilient lip of sufficient stiffness to provide a suitable pivoting action, without damaging the tube. If an internal mandrel is employed as cooling surface, the fulcrum conveniently comprises a resilient member, such as a disc of rubber or like material located at the downstream end of the mandrel, thereby serving not only as a fulcrum about which the tube may be pivoted, but also as a seal to prevent the inflating gas, employed to expand the subsequently reheated tube to form oriented tubular film, from passing back between the mandrel and tube to rupture the latter in the vicinity of the extrusion orifice where the freshly extruded tube is in a molten, and therefore relatively weak, condition. The seal also prevents escape of heat-transfer fluid along the wall of the extruded tube into the reheating and orienting zones. Similarly, if a closely fitting external cooling jacket or weir is employed, the fulcrum conveniently comprises a resilient annular washer or gasket located at the downstream end of the jacket and closely engaging the outer surface of the tube.

Suitably the fulcrum projects transversely of the cooling surfae by a distance of at least 0.25 mm, preferably between 0.5 and 1.5 mm.

Although the transverse displacement of the tube relative to the cooling surface may be effected by means located within the tube — for example, by lateral displacement of either the internal seal hereinbefore described, or a separate internal thrust member, we prefer, for ease of operation, to employ an external thrust member bearing against the outer surface of the extruded tube. The external thrust member may comprise a simple surface, such as a plate, rod, or bar, which may be urged against the tube surface in an appropriate position to effect the desired transverse displacement of the tube relative to the cooling surface. If desired, the surface of the thrust member may be perforated, and a gas, suitably air, discharged through the perforations at a rate and pressure sufficient to create a gas-bearing which will effect displacement of the tube without damaging the surface thereof. The thrust member may, if desired, encircle the tube either in the form of a continuous annular surface, or as a plurality of discrete surfaces, e.g. arcurate plates, constituting a discontinuous annular surface. However, in a preferred embodiment of the invention the thrust member comprises at least one roller adapted to rotate in the direction of extrusion of the tube, each roller being displaceable transversely into engagement with the tube surface to alter the thickness of the fluid sheath between the tube and cooling surface. Conveniently, a plurality of rollers, say 12 or 16, are mounted in the form of a ring, displaceable transversely relative to the tube, the axis of rotation of each roller being disposed tangentially to an imaginary circle circumscribing the tube in a plane substantially normal to the direction of extrusion of the tube. Any or all of the rollers may be positively driven, but we prefer that individual rollers in the ring should be free to rotate simply by engagement with the tube surface.

Suitably the thrust members are fabricated from plastics materials, or metals — such as mild steel, aluminium, or an alloy thereof, and, if desired, the surface of each roller may be treated to optimise the coefficient of friction between the roller and the tube. Suitable surface treatments include abrading the roller surface — for example, by shot- or grit-blasting, or by coating the roller surface with a polymeric material such as polyhexamethylene adipamide, or polytetrafluoroethylene.

The thrust member is suitably so positioned relative to the cooling surface that the extruding tube has solidified sufficiently at the point of contact with the thrust member to respond to the applied thrust. The thrust member may, therefore, be located downstream, or, if desired, within the extremities, in the direction of extrusion, of the cooling surface. However, we prefer that the thrust member be located beyond the downstream extremity of the cooling surface. To ensure that the tube is transversely displaceable relative to the cooling surface, the thrust member should, of course, be located on the upstream side of the means, for example — nip rollers, employed to withdraw the tube over the cooling surface. If nip rollers are employed, they are preferably so dimensioned that the tube is not collapsed across its entire width.

Transverse displacement of the thrust member is conveniently effected by adjustment of a simple screw or worm mechanism, but other systems — such as, hydraulic or pneumatic actuating mechanisms, may be employed. Adjustment may be effected manually or automatically — for example, in response to signals transmitted from a sensor positioned to determine a suitable parameter, such as the temperature, or lateral position of the tube or of a tubular film blown therefrom.

Although the techniques of the present invention may be employed to cool tubes derived from any tube-forming materials, the techniques are preferably employed in relation to the production of tubular films from any thermoplastic polymeric material, and particularly in the production of films and tubes from crystalline or crystallisable polymers. For example, polymers and copolymers of 1-olefines, such as high density polyethylene, polypropylene or ethyiene propylene copolymers, of polybutene-1, of poly-4-methyl pentene-1, of polyesters such as polyethylene terephthalate and polyethylene-1,2-phenoxyethane-4,4'-dicarboxylate, of polysulphones, and of the various nylons, may be processed. A suitable film-forming material is a high molecular weight stereo-regular predominantly crystalline polymer of propylene, either in the form of a homopolymer or copolymerised with minor quantities (e.g. up to 15% by weight of the copolymer) of other unsaturated monomers, such as ethylene. Coated films and coextruded films may also be processed.

Figure 2:
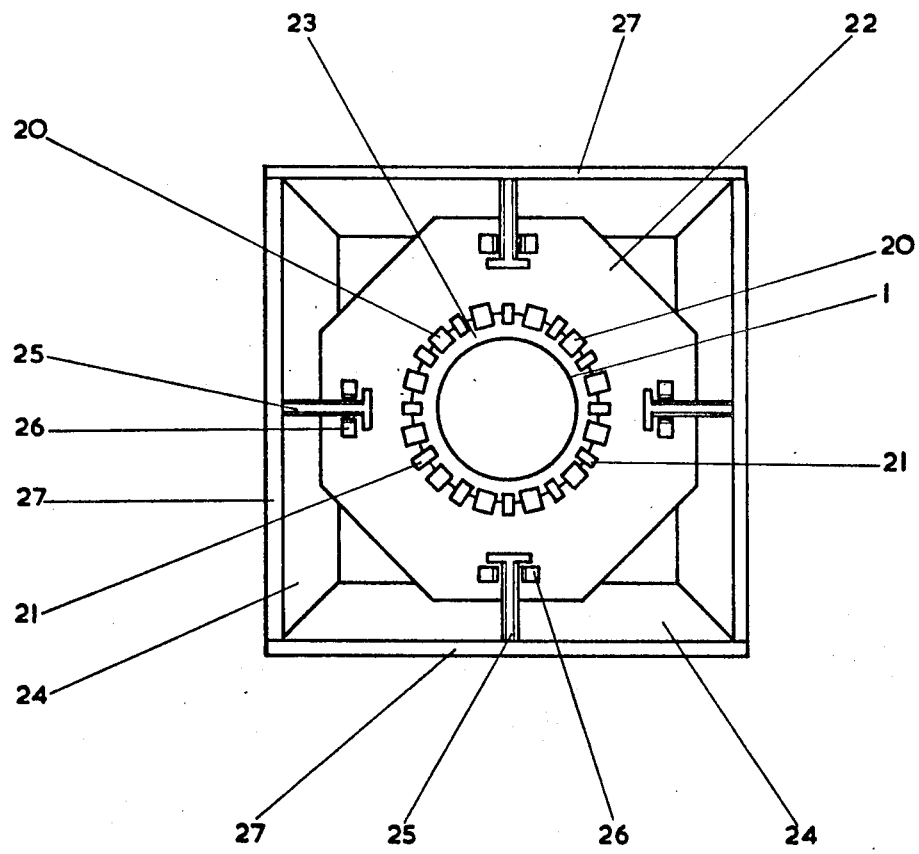
Figure 3:
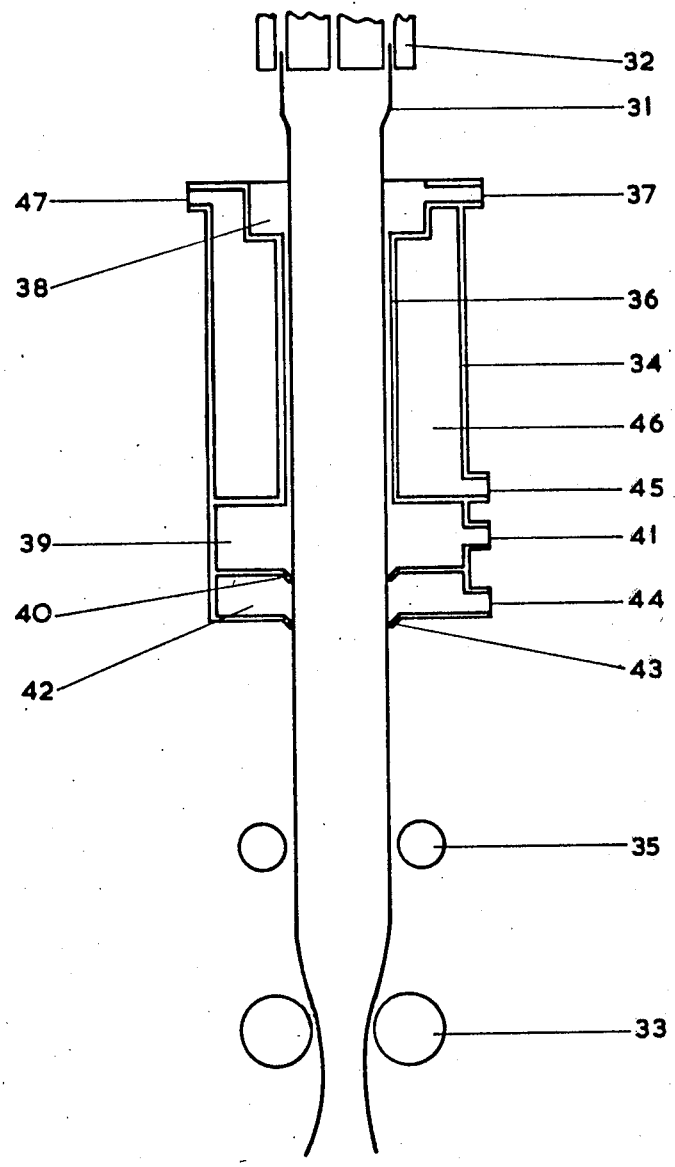

The invention is illustrated by reference to the accompanying drawings in which:

FIG. 1 is a schematic elevation depicting the production of an oriented tubular polymeric film using a lubricated mandrel cooling surface in combination with a roller thrust bearing, FIG. 2 is a plan view of the roller bearing assembly along the line II—II of FIG. 1, and FIG. 3 is a simplified elevation depicting the production of tubular film using an external cooling surface in combination with a roller thrust bearing.

Referring to FIG. 1, a tube of thermoplastic material 1 is shown being extruded from an annular extrusion die 2. The tube is withdrawn from the extrusion die by a pair of contrarotating nip rolls 3 which are of width less than the collapsed tube. The rolls 3 withdraw the tube at a speed greater than that at which it is extruded, thus hauling the tube down on to a cooling mandrel 4 situated inside the tube. Water is supplied to between the tube and the mandrel by maintaining a small head of water in the space 5 at the top of the mandrel. Water is therefore carried down between the mandrel 4 and the tube 1, thereby transferring heat from the tube to the mandrel which is itself cooled by an internal flow of cooling water, runs into the space 6 formed between the bottom of the mandrel and a resilient sealing member 7, and is removed from this space through a pipe (not shown) which passes through the centre of the mandrel.

Below sealing member 7 is positioned a circular sponge 8 which contacts the inside of the tube 1 to collect any moisture which passes the seal, this moisture being removed from the sponge 8 by applying vacuum through a suction pipe (not shown).

In practice an intermediate sealing member is usually positioned between sealing member 7 and sponge 8 together with means to pressurise the tube in this region, and to control the extent to which water from space 6 penetrates between the mandrel and the tube, but these details are omitted to clarify the drawing.

As well as being cooled internally, the tube 1 is cooled externally by passage through a water bath 9 which surrounds the tube. Water is continuously introduced into the water bath through pipe 10 and flows out through pipe 11. After passing through the water bath, the tube passes through a chamber 12 where vacuum is applied through pipe 13 to remove surplus water from the outside of the tube.

The cooled tube is withdrawn through a roller thrust bearing, generally designated 14, by the pair of nip rolls 3 which control the speed at which the tube is travelling, and is then passed through banks of infra-red heaters 15 and 16 which raise the temperature of the tube to that required for stretching. The tube is then stretched in the direction transverse to its direction of extrusion by air under pressure introduced to within the tube through pipe 17, and is simultaneously stretched longitudinally by a pair of nip rolls (not shown) which form an air tight seal across the tube, and withdraw the tube at a rate greater than that at which it is withdrawn from the extrusion die by the nip rolls 3.

The roller thrust bearing 14 is conveniently described by reference to FIG. 2 and comprises a ring of 12 independently rotatable nylon rollers 20, bearing against the tube surface, and supported between twelve bearing brackets 21 secured to an octagonal, steel base plate 22 having an annular orifice 23 through which the cooled tube 1 passes. The steel base plate 22 is located within a rigidly mounted, rectangular framework of steel struts of right angled section 24, provision being made to effect lateral displacement of the roller ring relative to the framework, and thus to the tube, by means of four adjusting screws 25, each adjusting screw being located in a threaded block 26 secured to the surface of the base plate, so that the tip of each screw bears against an upstanding flange 27 of the framework. By appropriate adjustment of screws 25 the base plate, and the roller ring mounted thereon, can be moved laterally in a plane normal to the axis of the tube.

Referring again to FIG. 1, if the roller ring is displaced to the right of the drawing, the tube 1, being relatively rigid, pivots about the seal assembly 7, which, although of resilient material such as silicone rubber, is sufficiently rigid to act as a fulcrum, and the right hand region of the tube 1 approaches more closely to the mandrel 4, thereby being more effectively cooled in that region.

FIG. 3 shows a tube of thermoplastic material 31 being extruded from an annular extrusion die 32, and withdrawn, by a pair of contrarotating nip rolls 33 which partially collapse the tube, through an annular cooling jacket 34 and thence through a thrust roller system 35 of the kind depicted in detail in FIG. 2. Thereafter, the tube is heated, inflated, and collapsed as described with reference to FIG. 1.

Cooling jacket 34 comprises an annular cooling surface 36 closely engaging the outer surface of tube 1, cooling water being fed via pipe 37 to annular chamber 38 at the upper end of the jacket, and thence, as a thin heat-transfer and lubricating sheath, downwardly between the tube and cooling surface to chamber 39 where the water accumulates above a resilient annular silicone rubber seal 40 in engagement with the tube surface, and is removed via pipe 41. Excess moisture passing downstream of seal 40 is trapped in chamber 42 above resilient annular seal 43, and is removed by the application of suction to pipe 44. Additional cooling water is continuously fed through pipe 45 to annular chamber 46 surrounding cooling surface 36, and escapes through pipe 47.

Preferential cooling of a selected area of the tube is effected by appropriate lateral displacement of cooling ring 35, whereby the relatively rigid tube 31 is pivoted about the seal assembly 40, 43 to bring the selected area of tube surface into more intimate contact with annular cooling surface 36.

The present invention is further illustrated by the following Examples in which biaxially oriented films are produced using an apparatus of the type illustrated in FIG. 1.

EXAMPLE 1

A propylene homopolymer was extruded at a rate of 520 lbs (230 kg) per hour through an extrusion die of diameter 6.5 inches (165 mm) with a die gap of 60 thousandths of an inch (1.52 mm). The top of the mandrel was 1 inch (25.4 mm) from the extrusion die, and the mandrel had a diameter of 6.25 inches (158.7 mm) at the top, had a matt surface, was 48 inches (1.22 meters) long and was 6.125 inches (155.6 mm) in diameter at its bottom end. Water was supplied to the gap between the extrusion die and the mandrel at a rate of 30 gallons per hour (136 dm$^3$h$^{-1}$) so that a heat-transfer sheath of water was carried down between the tube and the mandrel. The mandrel itself was internally cooled by cold water.

The tube was drawn down over the mandrel by means of nip rolls 3 which collapsed the tube only at its centre and which rotated at a peripheral speed of 23 ft/minute (0.117 ms$^{-1}$). Simultaneously, the outside of the tube was cooled by the cooling bath to which cooling water was supplied through pipe 10 at a rate of 700 gallons per hour (3185 dm$^3$h$^{-1}$). The top of the water bath was 11 inches (279 mm) above the bottom end of the mandrel.

After passage through the roller ring 14 and the rolls 3 the tube was heated to a temperature of about 160° by infra-red heaters 15 and 16, and stretched in the direction transverse to its direction of extrusion by air at a pressure of 5 inches water gauge (126 kgm$^{-2}$) introduced through pipe 17, the tube being expanded to a diameter of 45.25 inches (1149 mm). The tube was also stretched in its direction of extrusion by nip rolls which withdrew the expanded tube at a speed of 195 feet per minute (0.99 ms$^{-1}$).

By appropriate lateral adjustment of the roller ring 14, the number of adjustments required varying with circumstances but being on average from 1 to 4 per 12 hours, uniform cooling of the extruded tube was effected, and tube of consistently good thickness profile was produced at the aforementioned rate. The average variation in profile across the width of the film, as measured by a conventional radiation absorption gauge, was consistently within a range of from 5 to 6%, and over a period of time only a small proportion of the film produced had to be rejected because of profile defects.

Polypropylene film produced under identical conditions, but in the absence of a roller ring assembly, showed a significantly higher incidence of thickness profile defects, the average profile variation across the width of the film increasing to within a range of from 6 to 8.5%, and over a similar period of time the rejection rate because of unacceptable profile increased by from 5 to 10% of the film produced.

EXAMPLE 2

A similar improvement in film profile, and reduction in the amount of film rejected, was observed when the procedure of Example 1 was repeated using, instead of the propylene homopolymer, a propylene-ethylene block copolymer containing varying amounts of ethylene up to 15% by weight of the copolymer.

EXAMPLE 3

A similar improvement in film profile, and reduction in the amount of film rejected, is achieved when the procedure of Example 1 is repeated using, instead of the propylene homopolymer, polyethylene terephthalate having an intrinsic viscosity of 0.62, as measured in orthochlorophenol at 25° C, the extrusion temperature of the polymer being 270° C, the orienting temperature in the range of from 85 to 95° C, and the draw ratio in each of the longitudinal and transverse directions being approximately 3.5:1.

We claim:
1. A method of cooling an extruding tube of thermoplastic material comprising feeding the tube, in the direction of extrusion, in heat-transfer relationship with an adjacent cooling surface, maintaining said cooling surface at a temperature below the melting point of the thermoplastic material to solidify the tube, maintaining a sheath of a heat-transfer fluid between, and in contact with, the tube and said cooling surface, and applying a transverse thrust to the solidified tube surface, at a position downstream of said cooling surface, more effectively to cool a selected area of the extruding tube by displacing the tube transversely of the direction of extrusion to decrease the thickness of the fluid sheath between the selected area and the cooling surface.

2. A method according to claim 1 comprising pivoting the extruding tube about a fulcrum located at or adjacent the downstream end of the cooling surface, to decrease the thickness of the fluid sheath between the selected area of the tube and the cooling surface, the transverse thrust being applied to the tube surface at a position downstream of said fulcrum.

3. A method according to claim 1 wherein the cooling surface comprises a cooled mandrel positioned within the extruding tube.

4. A method according to claim 1 wherein the transverse thrust is effected by a ring assembly comprising a plurality of rollers, the axis of rotation of each roller being disposed tangentially to an imaginary circle circumscribing the tube and in a plane substantially normal to the direction of extrusion.

5. A method according to claim 1 wherein the heat-transfer fluid is a liquid.

6. A method according to claim 1 wherein the tube is of a propylene homopolymer or a copolymer of propylene with up to 15% by weight of the copolymer of an unsaturated monomer.

* * * * *